Feb. 2, 1971  A. L. STONEBRIDGE ET AL  3,559,469
METHOD AND MEANS FOR TENSILE TESTING MATERIALS
Filed Nov. 1, 1968  3 Sheets-Sheet 1
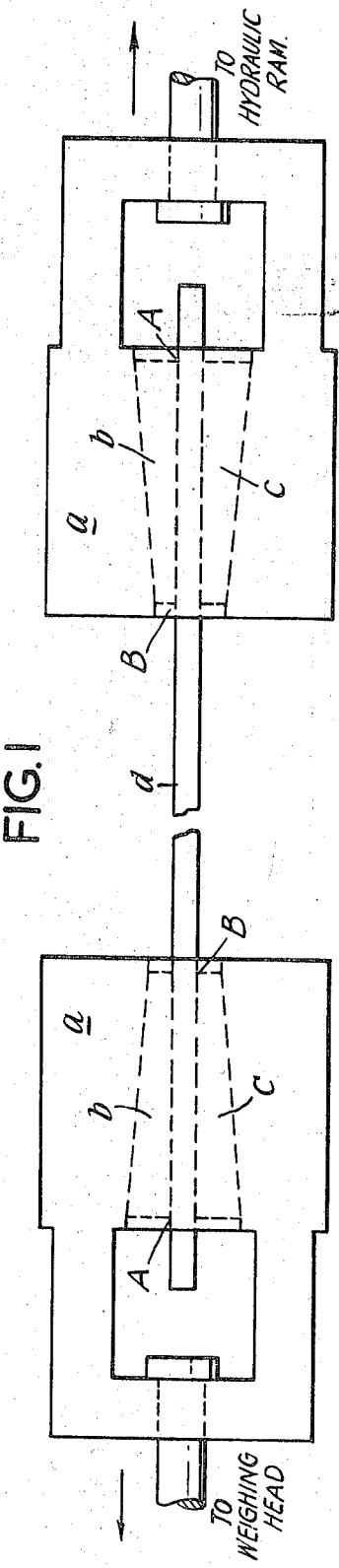
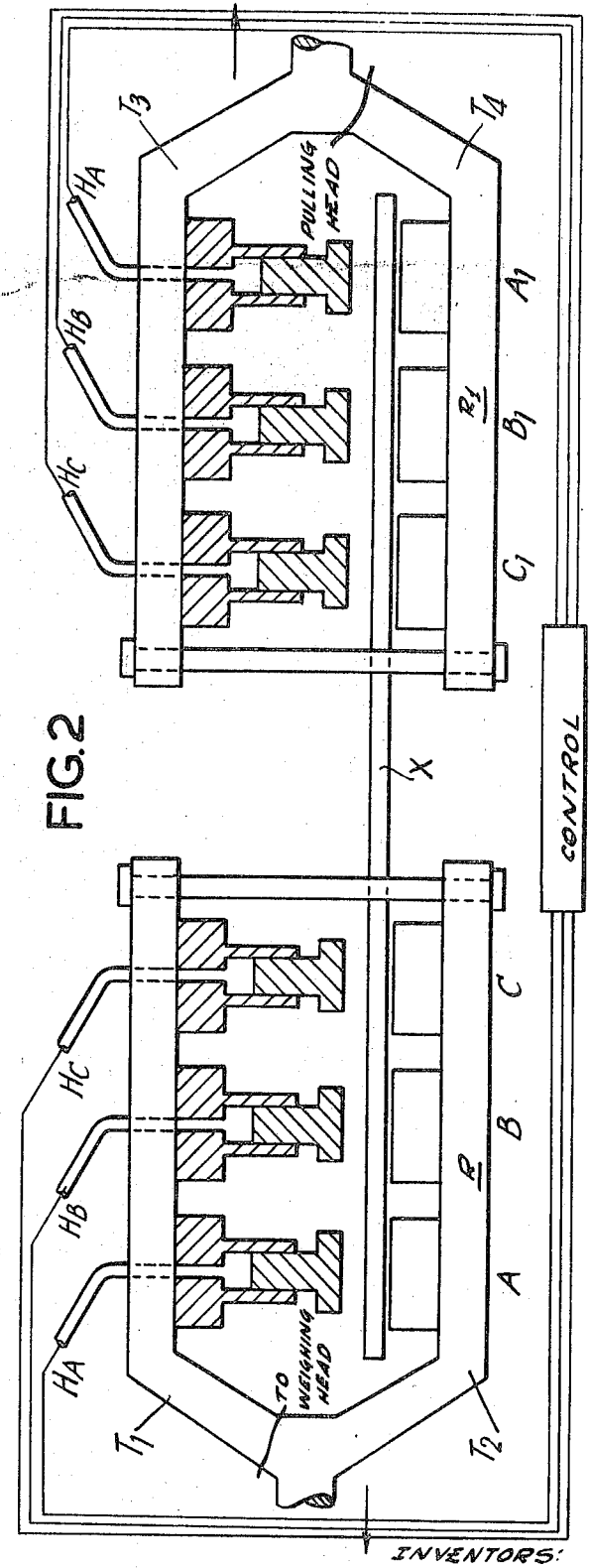
INVENTORS:
Arthur Leslie Stonebridge
Malcolm Ellison
By Pierce, Scheffler & Parker, Attys

United States Patent Office 3,559,469
Patented Feb. 2, 1971

3,559,469
METHOD AND MEANS FOR TENSILE TESTING MATERIALS
Arthur L. Stonebridge, Shipley, and Malcolm Ellison, Batley, England, assignors to BBA Group Limited, Yorkshire, England, a British company
Filed Nov. 1, 1968, Ser. No. 772,625
Claims priority, application Great Britain, Nov. 3, 1967, 50,090/67
Int. Cl. G01n 3/08
U.S. Cl. 73—95
10 Claims

ABSTRACT OF THE DISCLOSURE

This specification discloses a method of and apparatus for gripping and tensioning a length of material, more particularly tensioning it for the purpose of testing its tensile strength. The material is gripped by inserting each of two of its opposing end portions into at least one array of clamps, each array comprising at least two clamps aligned one behind the other in the direction of the opposing pulling forces, by tightening at least the two outermost clamps onto the material which is then tensioned in successive steps in such a fashion that although the material between each outermost clamp and its adjacent clamp towards the centre portion of the material is pre-tensioned it is in fact only the portion of material located between the two innermost clamps of the opposing arrays which is subjected to the desired ultimate tension.

---

This invention relates to a method of and means for holding materials under tension, for such purposes as, for example, the tensile strength measurement of strip-like or sheet-like materials. The invention has been found to be particularly effective in overcoming difficulties encountered when tensile testing fabric, such as textile webbing, and it will be described in relation to fabric testing, although this is not to be taken as limiting the scope of the invention to any particular strip or sheet material.

The invention aims to provide an improved method of holding materials under tension and of tensile testing them, by modifying the way in which the jaws of tensile testing machines are arranged and used.

The invention will now be described, with reference to the accompanying drawings in which:

FIG. 1 is a side elevational view of a pair of jaws of a conventional tensile testing machine;

FIG. 2 is a diagrammatical representation of the subject matter of the present invention;

Figure 3:
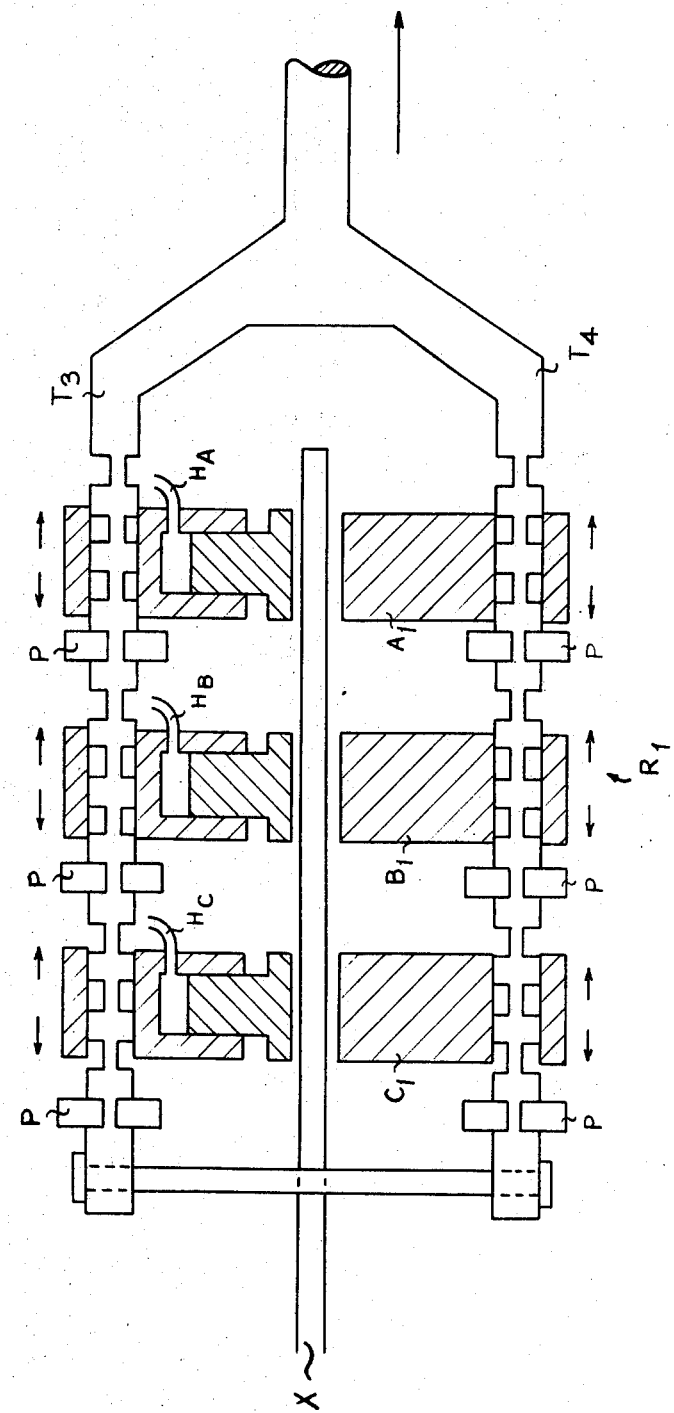
Figure 4:
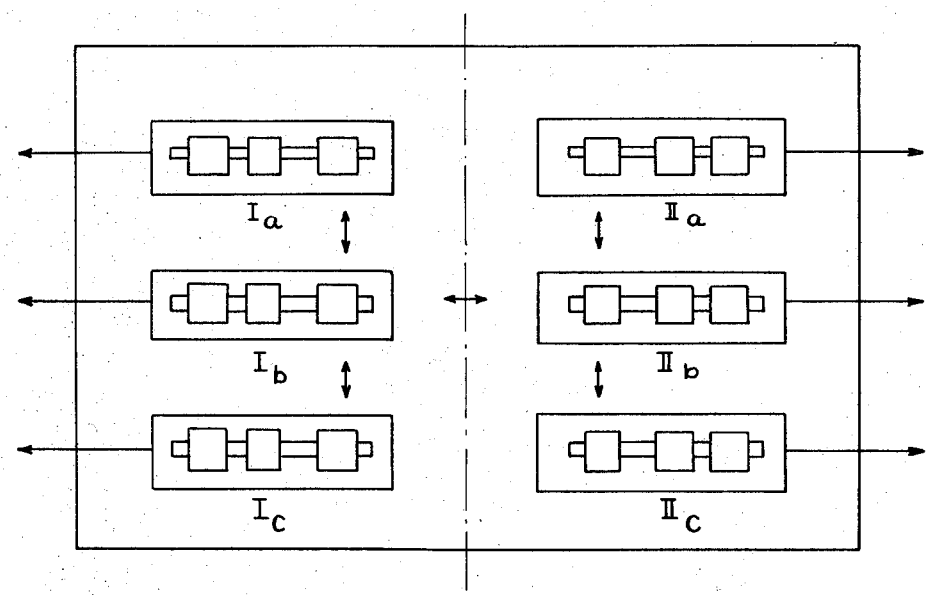

FIG. 3 is a side elevational view of one embodiment of a gripping member according to the invention, showing the feature of having certain gripping clamps movable with respect to a tie bar in which they are contained; and FIG. 4 is a top plan view of another embodiment of the invention especially adapted for grasping a sheet of test material, in which embodiment two rows of gripping members oppose each other, each row being operatively connected to a pulling head or weighing head of a tensile strength testing machine.

To explain the invention, it appears appropriate to explain first a conventional test rig, which is shown diagrammatically in FIG. 1 of the accompanying illustrative drawings, which shows a side elevational view of a pair of jaws (sometimes together termed a "clamp") testing a strip of fabric.

A common type of jaw used in a tensile test machine is the so-called wedge grip jaw. This, as shown in FIG. 1, consists of two wedge boxes a, and two wedge grip jaws b and c in each of the boxes a, holding a piece of fabric d. When the test is carried out a hydraulic ram or other stretching device moves the right hand wedge box a in the direction of the arrows, against a measured resistance of a weighing head. This causes the wedges b and c to tighten on the fabric d. The pressure developed on the fabric surface must be sufficient to hold the fabric without undue slippage until the tensile load is sufficient to break the test piece.

In practice, certain undesirable effects are liable to arise. It is evident that at the points A the fabric d must be under no load. At the points B, it must be at the full load applied by the test machine. In consequence there is a tensile stress gradient between A and B and the fabric will stretch. Consequently, relative movement must take place within the jaws between the fabric and the jaw faces of the wedge box grips. The fact that the elongation of the fabric must invariably be accompanied by a reduction in its thickness results in its being more tightly gripped at the back of the jaw (point A) than at the front (point B). This is liable to damage the fabric, due to abrasion, and to cause it to break at the jaw (point B) at a load lower than its true tensile strength.

In general, these effects may be small and unimportant with a soft fabric with a high friction surface, and in a fabric provided with a thick coat of rubber or plastics material the effects may be negligible. However, the effects may be serious when tests are applied to tightly woven, high tensile, slippery fabric such as nylon or the polyester fibre known under the trademark "Terylene." The effect is enhanced if the material has a high elongation.

Various expedients have been adopted to minimise the effects. The use of serrated or roughened jaws is usual. These are liable to cause extra damage when elongation or creep occurs. Thin sheets of lead between the test strip and the wedges have also been used. In the case of fabrics these may be effective with coarse weaves, as the lead is impressed into the weave and increases the effective resistance to slip. However, they are of less value with close-woven hard and dense fabrics of high strength, where they exert very little control on slippage, and, owing to the high compressive load, spread and in some cases break up. To increase friction, the fabric surfaces may be treated with, for example rosin, or similar preparations.

Another entirely different procedure which is commonly adopted is to use a dumb-bell shaped test piece in which the minimum cross-sectional area (between the two pairs of jaws) is less than that in the jaws. Usually the test piece is of constant thickness but the ends in the jaws are wider than the minimum between the jaws. This method is successful and is that in most common use, with homogeneous materials. It has also been successfully applied to textile materials well bonded or impregnated with rubber or plastics. It is not directly applicable to unimpregnated textiles owing to the fraying which occurs. An alternative is to narrow the fabric by cutting off the same width from each end, in the centre portion of the fabrics only, and then to fray out the loose edge on each side so that a definite width of fabric or a definite number of warp ends is left. The ends in the jaw are left wider. This is a satisfactory and commonly used method for such fabrics as thin single-ply cotton duck. It is less suitable for thicker multi-ply high-strength materials, since under tension the cut or frayed edges distort and may cause erroneous results. It is also uncertain to extrapolate the results of a cut or frayed piece, say 3" wide, to a woven webbing with selvedges, of 8" width, since the areas in the region of the selvedge will have slightly different tensile characteristics from those of the rest of the fabric.

The invention aims at providing a more reliable and in its results a more uniform method of and apparatus for gripping and tensioning lengths of materials, particularly, although, not necessarily, for the purpose of tensile testing such materials.

Thus, from one aspect the invention consists in a method of gripping and tensioning a length of material to be subjected to two forces arranged to be effective in the plane containing the material and to pull it in opposite directions, which method comprises the steps of inserting each of the two opposing end portions of the material into at least one array of gripping elements each array comprising at least two clamps aligned on a tie bar one behind the other in the direction of the opposing pulling forces; and so of gripping the material between corresponding pairs of clamps of each array and so increasing the distance between the clamps of the several corresponding pairs of the oppositely arranged arrays that before the material in the central space between the innermost clamps reaches the ultimate stress the material in the space, or spaces, between the corresponding adjacent clamps of the oppositely arranged arrays has been diminishingly stressed in stages the further it lies from the central space.

From another aspect, the invention consists in apparatus adapted to grip opposing end portions of a length of sheeted or strip test material for subjecting its center portion to tensile test, comprising at least two spacedly arranged gripping members, each comprising a tie bar and an array of gripping clamps therein arranged in series one behind the other in a direction normal to said center portion, one of said gripping members for gripping one end portion of said material and the other of said gripping members for gripping the opposite end of said material; wherein the array in each said gripping member is constituted by the same number of clamps (said number being not less than two); means for closing the corresponding pairs of clamps of said arrays in series inwardly, beginning with the outermost pair; means for exerting a separating force on said gripping members to apply tension to said center portion of said material and means for increasing said tension each time that a corresponding pair of clamps has been closed.

From yet another aspect the invention consists in apparatus adapted to grip opposing end portions of a length of sheeted or strip test material for subjecting its center portion to tensile test, comprising at least two spacedly arranged gripping members, each comprising a tie bar and an array of gripping clamps therein arranged in series one behind the other in a direction normal to said center portion, one of said gripping members for gripping one end portion of said material and the other of said gripping members for gripping the opposite end portion of said material; wherein the array in each said gripping member is constituted by the same number of clamps (said number being not less than two); and wherein the clamps of each said gripping member are aligned in the tie bar one behind the other in the direction of opposing pulling forces to be applied to said material, wherein at least the corresponding clamps inwardly from the outermost clamps of each of said opposing gripping members are associated with a common source of power and arranged to be closed simultaneously.

From another aspect, the invention consists in apparatus adapted to grip and tension a length of material and to subject it to two forces effective in the plane containing the material and to pull it in opposite directions, comprising at least two spacedly arranged arrays of gripping elements one for gripping one end portion of the material and the other for gripping the opposite end portion thereof, wherein each array is provided with the same number of clamps and the number is not less than two, wherein the clamps of each array are aligned on a tie bar one behind the other in the direction of the opposing pulling forces to be applied to the material and wherein at least the corresponding clamps inwardly from the outermost clamps of each of the opposing arrays are associated and arranged to be actuated simultaneously.

A method according to the invention may be implemented by two alternative procedures. In one instance, the material may initially be gripped by tightening the outermost clamps of each of the oppositely arranged arrays; it may then be subjected to an initial predetermined tension—which, preferably is substantially below the ultimate tensile strength of the material—by increasing the distance between the oppositely arranged arrays; subsequently, the corresponding inwardly adjacent clamps of the opposite arrays may simultaneously be tightened in series while further serially increasing the tension on the material after each such pair of clamps has been tightened, and eventually, after all the corresponding clamps of the oppositely arranged arrays have been tightened, the material after each of such pair of clamps has been tight-subjected to the desired ultimate tension.

This particular procedure involves the use of at least two oppositely arranged and separable arrays of clamps, the clamps of each array being rigidly mounted on their respective tie bars.

An alternative procedure of implementing a method according to the invention may comprise the steps of initially gripping the material by tightening all clamps of the oppositely arranged arrays; of then subjecting the material portions located between the outermost clamps of each array to an initial predetermined tension—which again is preferably substantially below the ultimate tensile strength of the material—by increasing the distance between the outermost clamps; of fixing thereafter the corresponding adjacent clamps of each array to their respective tie bars and of increasing the distance between said corresponding adjacent clamps, for example—by increasing the distance between the two arrays to which they have been fixed, thus also increasing the distance between the outermost clamps—in such a fashion that the tension exerted upon the material portions located between them and their adjacent outermost clamps remains substantially constant while simultaneously the tension exerted upon the material located between them, or the material portions located between them and the corresponding clamps of each array adjacent to them on the remote side from the outermost clamps, is increased, and, in the event of more than two clamps being provided in each array, of repeating this step until all the material portions between the corresponding adjacent clamps are diminishingly stressed below the predetermined value and the material in the central space reaches the desired ultimate tension. If this procedure is followed for implementing a method according to the invention, it is preferable to use arrays in which only the outermost clamps are rigidly mounted on their respective tie bars while the other clamps are movably mounted. Alternatively, all the clamps may be movably mounted.

If a method according to the invention is used for testing the tensile strength of a material, the desired ultimate tension is then conveniently the force required for breaking the material.

Corresponding clamps in each array may be tightened simultaneously.

The advantages of these multi-stage clamps are associated with the fact that when any test strip is subjected to tension it stretches and becomes thinner. As indicated previously, a single pair of jaws in a conventional wedge-box cannot therefore exert a uniform pressure on the test piece, and additionally the fabric must stretch within the wedge-box and the maximum stretch must occur at the end of the box where the fabric is at full tension.

In contrast thereto, with a multi-stage clamping system according to the invention, the stretch is taken up in a number of stages. When the final stage clamps are tightened the tension on the material is already approaching the maximum and very little further stretching occurs.

Hence, the damage done to the material by stretching within the innermost jaws is greatly reduced, and breaks in the jaws, at a lower tension than the true tensile strength of the material, are much less liable to occur.

Any suitable method of tightening the clamps may be used. A preferred method is to use hydraulically operated clamps, since this makes it easy to close them exactly when required and to apply any desired pressure, and also to close the corresponding clamps on each side simultaneously. Hydraulic operation also ensures follow-up by the clamp to maintain its grip as the material is compressed.

In order to make the invention more easily understood, some embodiments thereof will be now described in more detail with reference to FIG. 2 of the accompanying diagrammatic drawings, which illustrates apparatus according to the invention including two oppositely arranged arrays each being provided with three clamps. Although the invention will be described substantially with reference to gripping and tensioning a length of material for the purpose of testing its tensile strength, it should be understood that the invention is not restricted to this particular purpose.

Three spacedly arranged hydraulic clamps, A, B, and C on one side and $A_1$, $B_1$ and $C_1$ on the other, are shown ready for use on a test strip X. The clamps A, B and C constitute an array generally denoted by the reference character A, and are connected to the weighing head of a tensile-test machine via tie bars, $T_1$ and $T_2$, on which they are rigidly mounted. Likewise, the clamps $A_1$, $B_1$ and $C_1$ constitute an array—generally denoted by the reference character $R_1$—and are connected to the pulling head of the test machine via tie bars $T_3$ and $T_4$. The arrays R and $R_1$ are arranged opposite to one another. The clamps A and $A_1$ are connected to a common hydraulic supply $H_A$. Likewise, the clamps B and $B_1$ are connected to a common supply $H_B$, and the clamps C and $C_1$ to a common supply $H_C$. Each of said common supplies is operationally connected with a control member for serially actuating the clamps. In each clamp springs are provided (not shown in diagram) to hold the clamps open until pressure is applied via the hydraulic system.

In order to accommodate differently profile test pieces, provision is made for the insertion of any desired type of facing on the platens of the hydraulic clamps. Lead strips, or any other abrasion-reducing insert, can also be inserted in one or more pairs of corresponding clamps between the latter and the test piece.

The apparatus operates as follows:

After inserting the two opposing ends of the test piece X into the arrays R and $R_1$ respectively the test piece is gripped initially by tightening simultaneously the two clamps A and $A_1$. It is then subjected to an initial tension below its ultimate tensile strength, the approximate value of which may be assumed to be known or, alternatively, readily ascertainable. This initial tensioning is effected by widening the distance between the arrays R and $R_1$. Thereafter, the clamps B and $B_1$ are tightened to the test piece X and the tension thereon between the latter clamps is further increased, again by separating the arrays R and $R_1$ further. Finally, after the clamps C and $C_1$ have been tightened to the test piece, the tensile strength of the test piece X is measured by increasing the distance between the arrays R and $R_1$ until the test piece breaks and by ascertaining the value of the force required for breaking it.

Instead of tightening the several corresponding clamps successively to the test piece, it is also possible to tighten all the clamps initially, and more or less simultaneously, to the test piece. This procedure requires an apparatus including a pair, or pairs, of oppositely arranged arrays the clamps of which, or at least the clamps other than the outermost ones, are movably mounted on their respective tie bars. Thus, referring again to FIG. 2, it should be assumed that the clamps A and $A_1$ are rigidly fixed as previously dscribed to the tie bars $T_1$, $T_2$ and $T_3$ and $T_4$ respectively, but that the clamps B, C, and $B_1$, $C_1$ respectively are not rigidly fixed and can thus move relative to the tie bars. It is possible, however, to arrange even for the clamps A and $A_1$ to be movable. In either case the method of procedure would be as follows: First, all clamps would be fully tightened on to the material X to be tested. Secondly, working with the knowledge of elongation characteristics of the material under test, the two outermost clamps A and $A_1$ would be separated until an elongation corresponding to the predetermined tension had been achieved in the material between the clamps A and $A_1$. Thereafter, clamps B and $B_1$ would be fixed to the tie bars in relative position and in such a fashion that the tension exerted upon the test piece by the spacing of the clamps A and $A_1$ remains initially unchanged. Thereafter the arrays are further separated so as to stress the material between the clamps B and $B_1$ to a tension higher than that between the clamps A and B and $A_1$ and $B_1$ respectively which remains substantially constant at the predetermined value. Similarly, when the material had reached the appropriate elongation between the clamps B and $B_1$, the clamps C and $C_1$ would be locked on the tie bars, whereafter the two arrays would be further separated in the manner described with reference to the first procedure.

As an example of the value of the jaws, the following results were obtained with conventional wedge jaws and with a triple stage clamping system according to this invention, using clamps rigidly mounted on their respective tie bars.

The tests were made on high-strength 6" wide nylon aircraft arrester tape. In the tests with both types of jaw—conventional and according to the invention—the tape surface was painted with a rosin solution and allowed to dry. In the conventional wedge jaw tests the jaw surfaces were serrated and strips of lead were used in the jaws. This was the method found by experience to give the best results attainable with conventional jaws.

In the tests with clamps according to the invention the primary and secondary clamps were also serrated and provided with strips of lead, but the tertiary clamps nearest the centre of the test tape were left smooth and lead strips not used.

Four tests with conventional jaws were carried out with the following results:

| Nature of break: | Tensile strength (b) |
|---|---|
| Good break | 79,500 |
| Good break | 80,150 |
| Break at jaw | 77,280 |
| Break at jaw | 67,200 |
| Average | 77,033 |

Eight tests were made with the clamps according to the invention, the primary clamps being tightened at the start of the test, the secondary clamps when the tensile load reached 33,600 lb., and the tertiary clamps when the load reached 67,200.

The results were as follows:

| Nature of break: | Tensile strength (b) |
|---|---|
| Good break | 87,140 |
| Good break | 85,120 |
| Good break | 75,260 |
| Good break | 86,240 |
| Good break | 84,000 |
| Good break | 83,780 |
| Good break | 86,240 |
| Good break | 85,120 |
| Average | 84,122 |

The advantages of the invention are self-evident. The most important point is the enormous reduction (on this particular test they were completely eliminated) of bad breaks at the jaw.

In further tests it has been found that the number of bad breaks had been reduced to a low percentage in the case of nylon webbing whereas the incidence of such breaks when using the conventional wedge grip jaws was much greater, and very variable, frequently, in a test series, exceeding 50% of the tests made.

The above-described serial tensioning of the test material is realizable through use of the gripping members illustrated in FIG. 3, according to which individual gripping clamps are movable longitudinally in the tie bar in which they are contained. As may be seen from this figure, a number of gripping clamps $A_1$, $B_1$, $C_1$, each of which is connected to a hydraulic supply $H_A$, $H_B$ and $H_C$ respectively, are arranged to slide along the tie bar until they abut against their respective retaining plates P which have been placed in predetermined positions along the tie bars. As indicated by the arrows, each gripping clamp can be moved forward and backward within the space between two retaining plates, or a retaining plate and the end of the tie bar, and the movement may be effected either manually or under power.

By means of this arrangement, the technician can effect an initial predetermined intermediate tension on the specimen of material under test and thereupon move corresponding gripping clamps, in their tie bars, away from each other whereby further to increase the tension in that portion of the test material which is between the opposing clamps so moved.

The arrangement of arrays of clamps and the methods of operation described appear also to be likely to facilitate testing of materials with high tensile strength but a low compressive strength, because the clamping pressure is reduced, dependent upon the number of clamps.

Moreover, it is believed that the same novel system of clamping strip material in two separable arrays, or in two separable rows of arrays, the rows arranged transversely to the direction of the pulling forces at opposite end portions of the material to be gripped, will find useful application to the stretching of metal strip and sheet to flatten them.

Flattening metal strip and sheet material by stretching to the extent that the yield point of the material is slightly exceeded is known and can be effective but the usefulness of the method is, in applicants' experience, limited by the difficulty of gripping sufficiently tightly without the metal breaking in the grips, the same difficulty as that experienced in the tensile strength testing of textile materials. The difficulty with gripping metals for stretching is at its greatest (with temper-rolled metal) when the tensile force needed to exceed the yield point approaches the ultimate tensile strength of the metal. With wide sheets there is the added difficulty of maintaining uniform grip across the full width of the sheet.

It is believed that by the use of arrays of clamps as herein described each clamp having a series of gripping members brought serially into operation, the danger of the metal breaking in the clamps will be substantially reduced.

When the edges of wide strip or sheet metal are to be gripped we contemplate the use of a plurality of separable arrays of clamps extending across the width to be gripped with their gripping members linked together in a manner calculated to bring about the desired serial application of the gripping force in each array so that grip would be uniformly balanced across the full width of both opposed edges of the strip or sheet. This effect is achieved most advantageously if the clamps of all arrays in one row are actuated together and simultaneously with the corresponding clamps in the opposite row. The number of arrays in each row in such an instance would substantially be determined by the width of the opposing and end portions of the material and it would be advantageous if the spacing of the arrays in each row is, at least to a limited extent, variable.

FIG. 4 illustrates this aspect of the invention, by showing two rows of opposed gripping members each row being operatively associated with one of the tensioning heads (pulling or weighing, as the case may be) of the tensile strength testing material. In this figure, the two opposed rows of gripping members are denoted by the reference numberals $I_a$, $I_b$ and $I_c$ and $II_a$, $II_b$ and $II_c$ respectively. The gripping members in the row I are arranged to grip the sheet to be tested at its one end portion while the gripping members in the row II are arranged to grip the opposite end portion of the material to be tested. The spacing between the members $I_a$, $I_b$ and $I_c$ and, likewise, the spacing between the members $II_a$, $II_b$ and $II_c$ may be varied by moving the gripping members parallel to the edge of the test material and perpendicularly to the direction in which the pulling forces are applied to the test material. Although each row is shown as comprising three gripping members, it should be understood that the number of gripping members in each row is not so restricted, it being substantially determined by the width of the material to be tested. Each gripping member includes, as shown, three gripping clamps arranged on a tie bar and the gripping clamps can either be slideably arranged on the tie bar or rigidly mounted thereon as previously described. Finally, corresponding clamps, for example the central clamps in all the gripping members $I_a$ to $I_c$ and $II_a$ to $II_c$, are arranged to be closed simultaneously.

The foregoing descriptions of the various aspects of the invention have given an example of a three-stage clamping device, but the invention is not limited to three stages. Any number of stages from two upwards is feasible. Three is the preferred number and has been found successful. For very high strength and difficult materials a greater number of stages would be beneficial, but increase in the number of stages adds to expense and complication and it is believed that there would be little or no benefit in going beyond five stages.

As previously mentioned, the preferred method of tightening the clamps is by means of hydraulic power. However, any other of the methods well known in the art, such as pneumatic, electromagnetic or any suitable mechanical means such as screws, which may be power operated, or levers, or toggle or wedge mechanisms, may be used for operating the clamps.

What we claim is:

1. A method of gripping and tensioning a length of material to be subjected to two forces arranged to be effective in the plane containing said material and to pull it in opposite directions, said method including a first step of inserting each of two opposing end portions of said material into a least one array of gripping elements each said array comprising at least two clamps aligned on a tie bar one behind the other in the direction of said opposing pulling forces; a second step of so gripping said material between corresponding pairs of clamps of each said array and so increasing the distance between the clamps of the several said corresponding pairs of said oppositely arranged arrays that before the part of said material in the central space between the innermost clamps of said oppositely arranged arrays reaches its ultimate stress, the remaining part of said material in the spaces between the corresponding adjacent clamps of said oppositely arranged arrays has been diminishingly stressed in stages the further it lies from said central space.

2. A method according to claim 1, wherein the steps includes:
   (a) initially gripping said material by tightening the outermost clamps of each of said oppositely arranged arrays;
   (b) subjecting said material to an initial predetermined tension by increasing the distance between said oppositely arranged arrays;
(c) simultaneously tightening in series the corresponding inwardly adjacent clamps of said oppositely arranged arrays while further serially increasing the tension on said material after each such pair of corresponding clamps has been tightened; and finally, after all the corresponding clamps of said oppositely arranged arrays have thus been tightened,
(d) subjecting said material between said arrays to the desired ultimate tension.

3. A method according to claim 1, wherein the steps include:
(a) initially gripping said material by tightening all clamps of said oppositely arranged arrays;
(b) subjecting the parts of said material located between the outermost clamps of each said array to an initial predetermined tension less than said ultimate tension by increasing the distance between said outermost clamps;
(c) fixing the corresponding adjacent clamps of each said array to their respective tie bars and increasing the distance between said corresponding inwardly adjacent clamps in such a fashion that the tension exerted upon the positions of said material located between such adjacent clamps in each said array remains substantially constant while simultaneously the tension exerted upon said material located between them is increased, and,
(d) in the case where more than two clamps are provided in each array, repeating said step (c) until all the portions of said material between said corresponding adjacent clamps are diminishingly stressed below said initial predetermined value and the material in said central space reaches said desired ultimate tension.

4. A method according to claim 1, wherein said desired ultimate tension is the force required to rupture said material.

5. A method according to claim 1, wherein each of said two opposing end portions of said material is gripped by a plurality of separable arrays of gripping elements, and wherein the corresponding clamps of all such arrays arranged at the one end portion of said material are actuated together and simultaneously with each of the corresponding clamps of such arrays of gripping elements arranged at the opposite end portion of said material.

6. A method according to claim 1, wherein an abrasion-reducing insert is inserted in at least one such pair of corresponding clamps between the latter and the surface of said material to be gripped.

7. Apparatus adapted to grip opposing end portions of a length of sheeted or strip test material for subjecting its center portion to tensile test, comprising at least two spacedly arranged gripping members, each comprising a tie bar and an array of gripping clamps therein arranged in series one behind the other in a direction normal to said center portion, one of said gripping members for gripping one end portion of said material and the other of said gripping members for gripping the opposite end portion of said material; wherein the array in each said gripping member is constituted by the same number of clamps (said number being not less than two), means for closing the corresponding pairs of clamps of said arrays in series inwardly, beginning with the outermost pair; and means for exerting a separating force on said gripping members to apply tension to said center portion of said material.

8. Apparatus according to claim 7, comprising two spacedly arranged rows of gripping members, wherein such two rows are arranged across the width of, and parallel to, said opposing end portions of said length of said test material, and wherein each such row is provided with the same number of gripping members, the spacing between said adjacent gripping members in said rows being variable, the number of gripping members being substantially determined by the width of the opposing end portions of said material to be gripped.

9. Apparatus according to claim 7, comprising two spacedly arranged rows of gripping members, wherein such two rows are arranged across the width of, and parallel to, said opposing end portions of said length of said test material, and wherein each such row is provided with the same number of gripping members, the spacing between said adjacent gripping members in said rows being variable, the number of gripping members being substantially determined by the width of the opposing end portions of said material to be gripped.

10. Apparatus adapted to grip opposing end portions of a length of sheeted or strip test material for subjecting its center portion to tensile test, comprising at least two spacedly arranged gripping members, each comprising a tie bar and an array of gripping clamps therein arranged in series one behind the other in a direction normal to said center portion, one of said gripping members for gripping one end portion of said material and the other of said gripping members for gripping the opposite end portion of said material; wherein the array in each said gripping member is constituted by the same number of clamps (said number being not less than two), and wherein at least the clamps other than the outermost clamps are movably mounted on their respective tie bars, means for closing the corresponding pairs of clamps of said arrays in series inwardly, beginning with the outermost pair; and means for exerting a separating force on said gripping members to apply tension to said center portion of said material.

References Cited
UNITED STATES PATENTS 2,454,850  11/1948  Van Winkle et al. ____ 73—103X
3,223,357   6/1967  Gloor _____ 73—103

JERRY W. MYRACLE, Primary Examiner

U.S. Cl. X.R.
73—103; 279—4